UNITED STATES PATENT OFFICE

FRANZ WEBEL, OF MANNHEIM, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

ESTERIFICATION PRODUCT OF DICARBOXYLIC ACIDS AND THEIR PRODUCTION

No Drawing. Application filed February 1, 1928, Serial No. 251,234, and in Germany February 2, 1927.

I have found that valuable water-soluble derivatives of organic di-carboxylic acids such as phthalic or succinic or tartaric acid, are obtained by acting on one molecular proportion of the acids with at least two molecular proportions of ethylene oxid or homologous oxids.

If the operation be conducted with ethylene oxid in the absence of a diluent or solvent, the reaction must be carried out at elevated pressure on account of the low boiling point of ethylene oxid. If a suitable diluent be employed, preferably the water-soluble product itself, the ethylene oxid, on being introduced into the warmed suspension of the acid, is rapidly absorbed into the solvent, the water-soluble product being formed, and for this reason the reaction may be carried out, in this case, at atmospheric pressure. The reaction may be accelerated by the aid of catalytic substances, such as salts of hydrohalides or of organic acids.

The resulting products are excellent solvents and plasticizing agents for many organic substances. The products correspond to the general formula

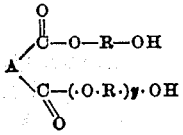

in which

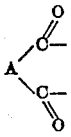

is the radicle of the dicarboxylic acid, A being an aliphatic or aromatic radicle, R is an alkylene radicle, containing at least two carbon atoms and $y$ is at least one.

The following examples will further illustrate the nature of the said invention which however is not limited thereto. The parts are by weight.

Example 1

Equal parts of ethylene oxid and finely pulverized phthalic acid are heated to from 60° to 65° centigrade in an autoclave, the mixture being kept stirred. As soon as the commencement of the reaction is indicated by a rise in the temperature, care must be taken, by stopping the application of heat, and, if necessary, by cooling, to prevent the temperature from substantially exceeding that specified. After the main reaction warming is continued until a sample exhibits a neutral reaction. The resulting reaction product is dissolved in about the same amount of water, and the solution clarified, if necessary, by shaking it with a little animal charcoal and filtering. The water and remainders of ethylene oxid are expelled from the clear solution by distillation in vacuo, and the residual product is completely dried by prolonged warming in vacuo. The product is a water-soluble highly viscous, inodorous and nearly colorless liquid.

Example 2

1 part of phthalic acid is suspended in about 2 parts of the product obtained according to Example 1, in a stirring pan, and ethylene oxid is passed into the suspension, at from 60 to 70° C., the amount being so chosen that practically all the ethylene oxid is absorbed by the liquid. As soon as the whole of the phthalic acid has passed into solution in the reaction product, a further quantity of the acid is introduced and this can be repeated as long as the capacity of the pan allows, ethylene oxid being added until the liquid is neutral. The resulting product is diluted with water and is then purified and dried as in Example 1.

Example 3

Ethylene oxid is allowed to act on a suspension of phthalic acid as described in Example 2, but with the addition of a small quantity, say 1 per cent, of sodium phthalate or 0.5 per cent of sodium chlorid. The absorption proceeds at a considerably more rapid rate. The further treatment is the same as in Example 2. The sodium phthalate or sodium chlorid remains dissolved in the finished product without reducing its quality.

Example 4

A mixture of 1 part of succinic acid with from 1 to 1.5 parts of ethylene oxid is heated in an autoclave while stirring at a temperature between 60° and 70° C., care being taken that this range of temperature is not exceeded. As soon as a sample of the reaction mass shows a neutral reaction the content of the autoclave is diluted with water. If necessary, the solution is shaken with a little animal charcoal and then filtered, the product being obtained by evaporating the water at reduced pressure, thereby simultaneously recovering the remainders of ethylene oxid. The product is a colorless, viscous liquid which is soluble in water in every proportion and cannot be distilled at atmospheric pressure without decomposition. The succinic acid may be replaced by tartaric acid, a product of very similar properties being obtained.

Example 5

1 part of finely pulverized tartaric acid suspended in 2 parts of the product obtainable from tartaric acid in accordance with Example 4 is heated to 60° C. On introducing ethylene oxid the latter is vividly absorbed under evolution of heat so that cooling is necessary. As soon as the whole of the tartaric acid has passed into solution a further quantity of acid is introduced and this can be repeated as long as the capacity of the reaction vessel allows. When the whole amount of tartaric acid is introduced, from 0.2 to 0.5 per cent of its weight of sodium chlorid are added by which catalyzing agent the esterification is quickly finished. As soon as a sample of the reaction mass shows a neutral reaction the ethylene oxid not absorbed is removed, preferably by heating at diminished pressure. The resulting product in which the sodium chlorid is dissolved is a colorless, sirup-like liquid which is miscible with water in every proportion and cannot be distilled at atmospheric pressure without decomposition. The yield arises to about the double quantity of the acid employed.

What I claim is:

1. A process for producing water-soluble derivatives of dicarboxylic acids which comprises acting on 1 molecular proportion of a dicarboxylic acid with at least 2 molecular proportions of an alkylene oxid.

2. A process for producing water-soluble derivatives of dicarboxylic acids which comprises heating 1 molecular proportion of a dicarboxylic acid with at least 2 molecular proportions of an alkylene oxid.

3. A process for producing water-soluble derivatives of dicarboxylic acids which comprises acting on 1 molecular proportion of a dicarboxylic acid with at least 2 molecular proportions of an alkylene oxid in the presence of a solvent.

4. A process for producing water-soluble derivatives of dicarboxylic acids which comprises acting on 1 molecular proportion of a dicarboxylic acid with a least 2 molecular proportions of an alkylene oxid in the presence of a solvent and of a catalyst comprising an alkali metal salt.

5. A process for producing water-soluble derivatives of dicarboxylic acids which comprises acting on 1 molecular proportion of a dicarboxylic acid with at least 2 molecular proportions of ethylene oxid by heating same at a pressure above atmospheric pressure.

6. A process for producing water-soluble derivatives of phthalic acid which comprises acting on 1 molecular proportion of phthalic acid at from 60° to 70° C. with at least 2 molecular proportions of ethylene oxid in the presence of a solvent and of a catalyst comprising sodium phthalate.

7. As new articles of manufacture the water-soluble, highly viscous and practically colorless condensation products of 1 molecular proportion of a dicarboxylic acid with at least 2 molecular proportions of an alkylene oxid corresponding to the general formula

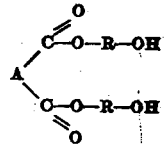

in which

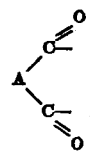

is the radicle of the dicarboxylic acid, A being an aliphatic or aromatic radicle, and R is an alkylene radicle containing at least two carbon atoms.

8. As new articles of manufacture the water-soluble, highly viscous and practically colorless condensation products of 1 molecular proportion of phthalic acid with at least 2 molecular proportions of an alkylene oxid corresponding to the general formula

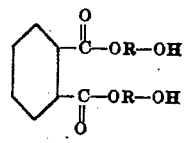

in which R is an alkylene radicle, containing at least two carbon atoms.

9. As a new article of manufacture the water-soluble, highly viscous and practically colorless condensation product of 1 molecular proportion of phthalic acid and at least 2 molecular proportions of ethylene oxid corresponding to the formula

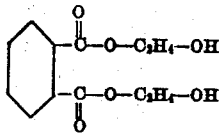

10. As new articles of manufacture the water-soluble, highly viscous and practically colorless condensation products of 1 molecular proportion of succinic acid with at least 2 molecular proportions of an alkylene oxid corresponding to the general formula

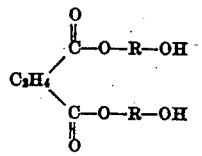

in which R is an alkylene radicle, containing at least two carbon atoms.

11. As new articles of manufacture the water-soluble, highly viscous and practically colorless condensation products of 1 molecular proportion of succinic acid with at least 2 molecular proportions of an alkylene oxid corresponding to the formula

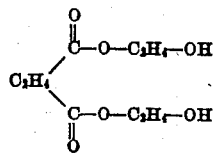

12. As new articles of manufacture the water-soluble, highly viscous and practically colorless condensation products of 1 molecular proportion of tartaric acid with at least 2 molecular proportions of an alkylene oxid corresponding to the general formula

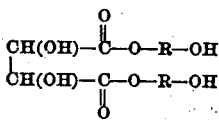

in which R is an alkylene radicle, containing at least two carbon atoms.

13. As new articles of manufacture the water-soluble, highly viscous and practically colorless condensation products of 1 molecular proportion of tartaric acid with at least 2 molecular proportions of an alkylene oxid corresponding to the formula

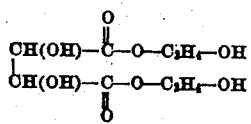

In testimony whereof I have hereunto set my hand.

FRANZ WEBEL.